Patented Dec. 7, 1926.

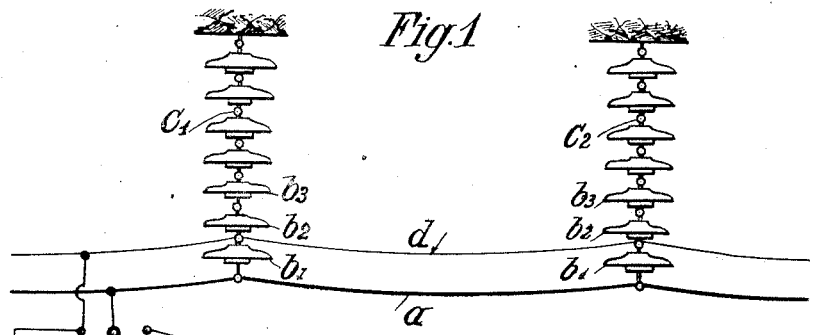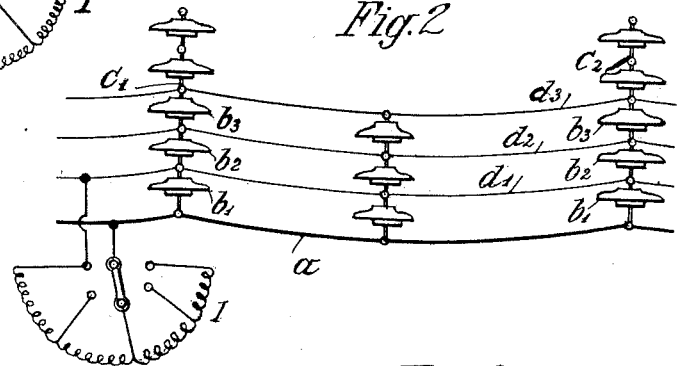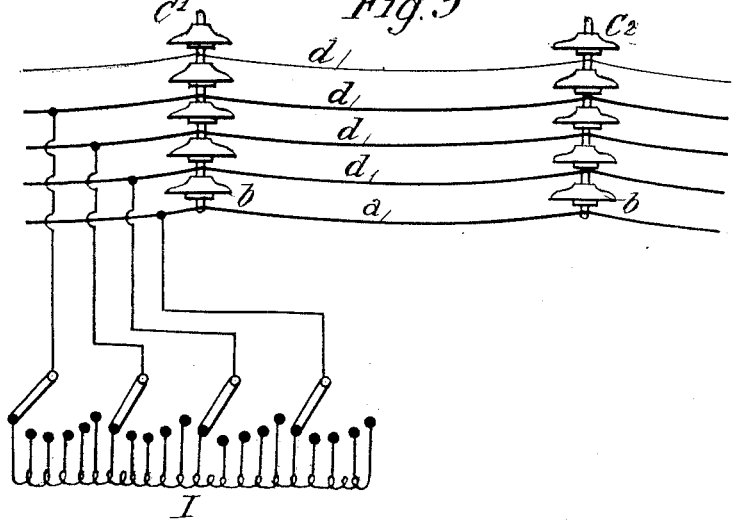

1,609,976

UNITED STATES PATENT OFFICE.

GEORGES VIEL, OF ST.-ETIENNE, FRANCE.

TRANSMISSION OF HIGH-TENSION CURRENTS.

Application filed October 31, 1922, Serial No. 598,222, and in France September 2, 1922.

The various elements which form a chain insulator suspending and insulating electric cables are subjected to very unequal differences of potential. Thus a much greater difference of potential can be measured at the terminals of the first element in contact with the cable than that indicated at the terminals of the second and so on.

Most of the elements therefore have little effect and whatever may be their number the first element cannot be rendered safe and is inevitably destroyed by age or by an excess voltage.

Moreover the voltage which can be conducted with safety is seriously limited. To overcome this defect it has already been proposed to distribute the potential between the several elements of the chain.

With this object it has already been proposed to connect together like insulators in the chain series by one or more metal cables termed balance cables. A condenser is thus formed, air being the dielectric and the balance wire and line wire its coatings or armatures. The capacity of this condenser will vary with the size of the conductors, their distance apart and if present on the intermediate insulators which may be inserted between two consecutive chains.

Such condensers being in parallel with like insulators in the chains the potential will be better distributed between the insulators and the difference of potential will thus be brought to a minimum which is a function of the variables forming the condenser.

In place of a single balance wire there may of course be several connecting together corresponding insulators in the chains which support the same line conductor.

With the object of more completely controlling the distribution of voltage taken by the several insulators of the chains and of, at the same time, damping the waves and thus neutralizing excess voltage to some extent, I according to this invention insert between the balance wire and the line wire a suitable impedance whose value is found experimentally.

Such impedance, which may consist of resistance, condenser, inductance coil or other arrangement, may be located either at the generating station or at the utilizing station or at both or at intermediate stations.

All the first insulators for example of the chains connected together by the balance wire are thus again shunted more or less according to the value of the impedance employed and the voltage which they take can then be varied as desired.

When employing several balance wires connecting the first, second, third, etc. insulators of the insulating chains together impedances (whose values have been found experimentally) are inserted between such wires as shown in Fig. 3.

The effect of shunting the balance wires by impedances is to improve transmission in several ways: firstly by causing a damping effect (due both to the action of the impedance and to that of the capacity of the assemblage composed of line, balance wire) which will have for effect to absorb to some extent the energy brought into action by an excess voltage at the moment of its occurrence, and then returning the energy in the form of waves which are less dangerous to the transmission system.

By substantially increasing the capacity of the line there will result an economy in the synchronous motors necessary for improving the power factor of the system and for regulating the voltage.

The accompanying drawing illustrates diagrammatically one of the ways of applying this invention to the high tension electric cable suspended by chain insulators.

Fig. 1 shows a single balancing wire $d$ connecting corresponding insulators of the chain insulators $C_1$, $C_2$ two chain insulators only being shown.

Fig. 2 shows several chain insulators with a number of balancing cables connected with the corresponding members of each chain.

Fig. 3 shows the use of impedances between balance wires when a number of balance wires are employed.

In each instance the line wire or main cable is indicated at $a$ while $b_1$, $b_2$, $b_3$ indicate the different members of each chain insulator, corresponding members of the chain insulators being connected by the balancing cable or wire $d$ in the usual way. I typifies the impedance hereinbefore described, shown in each instance as connected between the line $a$ and balancing wire or cable $d$ or $d'$ and having means of adjustment illustrated in conventional form. As will be obvious, all corresponding members of the several chains are thus shunted more or less according to the value of the artificial impedance thus introduced, so that their tension may be controlled as desired.

What I claim is:—

1. In the transmission of high tension currents the combination of a line wire, chain insulators suspending such line wire, a balance wire connecting together corresponding insulators of the several chains and impedances between the line wire and the balance wire.

2. In the transmission of high tension currents the combination of a line wire, chain insulators suspending such line wire, a plurality of balance wires each wire connecting together corresponding insulators of the several chains and impedances between the balance wires.

In testimony whereof I affix my signature.

GEORGES VIEL. [L. S.]